United States Patent
Witchel

(10) Patent No.: US 8,166,123 B2
(45) Date of Patent: Apr. 24, 2012

(54) COMPUTER SYSTEM TOOLS AND METHOD FOR DEVELOPMENT AND TESTING

(75) Inventor: John Witchel, San Francisco, CA (US)

(73) Assignee: Compuware Corporation, Detroit, MI (US)

(*) Notice: Subject to any disclaimer, the term of this patent is extended or adjusted under 35 U.S.C. 154(b) by 0 days.

(21) Appl. No.: 12/978,350

(22) Filed: Dec. 23, 2010

(65) Prior Publication Data

US 2011/0196936 A1    Aug. 11, 2011

Related U.S. Application Data

(63) Continuation of application No. 10/710,120, filed on Jun. 20, 2004, now Pat. No. 7,882,179.

(60) Provisional application No. 60/480,042, filed on Jun. 20, 2003.

(51) Int. Cl.
G06F 15/16    (2006.01)

(52) U.S. Cl. .......................... 709/206; 709/202

(58) Field of Classification Search .................. 709/202, 709/206
See application file for complete search history.

(56) References Cited

U.S. PATENT DOCUMENTS

| | | | |
|---|---|---|---|
| 6,664,978 | B1 | 12/2003 | Kekic et al. |
| 6,681,232 | B1 | 1/2004 | Sistanizadeh et al. |
| 6,766,165 | B2 | 7/2004 | Sharma et al. |
| 6,801,940 | B1 | 10/2004 | Moran et al. |
| 7,093,011 | B2 | 8/2006 | Hirata et al. |
| 7,145,457 | B2 | 12/2006 | Spitz et al. |
| 7,200,613 | B2 | 4/2007 | Schlonski et al. |
| 7,254,601 | B2 | 8/2007 | Baller et al. |
| 7,512,980 | B2 | 3/2009 | Copeland et al. |
| 7,752,301 | B1 | 7/2010 | Maiocco et al. |
| 2002/0116638 | A1 | 8/2002 | Dobes et al. |
| 2003/0110252 | A1 | 6/2003 | Yang-Huffman |
| 2003/0225876 | A1 | 12/2003 | Oliver et al. |
| 2004/0044753 | A1 | 3/2004 | Toyoshima et al. |
| 2004/0093408 | A1 | 5/2004 | Hirani et al. |

Primary Examiner — George C Neurauter
(74) Attorney, Agent, or Firm — Fenwick & West LLP

(57) ABSTRACT

The current invention allows a user to evaluate web pages, emails, or software across different operating systems without requiring the user to have the operating system being tested. The patent has a novel method to (1) generate screen captures in parallel, (2) create counter-anti-spam reporting and (3) a method to remotely interact any arbitrary operating system (DVA).

21 Claims, 5 Drawing Sheets

COMPUTER SYSTEM TOOLS AND METHOD FOR DEVELOPMENT AND TESTING

CROSS REFERENCE TO RELATED APPLICATIONS

This application is a continuation of U.S. patent application Ser. No. 10/710,120, filed on Jun. 20, 2004, entitled "Computer System Tools and Method for Development and Testing" (U.S. Pat. No. 7,882,179), which claims priority to U.S. Provisional Patent Application No. 60/480,042, entitled "Ad-Hoc OS Access System, BCProxy, Dynamic Page Accelerator, Emailcam And Browsercam," filed on Jun. 20, 2003, both of which are incorporated herein by reference.

BACKGROUND OF INVENTION

The invention relates to a tool to assist webmasters, developers, and quality assurance engineers to see a website, run application or see E-mail as it appears in any browser, E-mail system or any operating systems.

DESCRIPTION OF PRIOR ART

Today, applications that create screen captures are a commodity that has existed for nearly 20 years. Manufacturers include Microsoft, Apple, Adobe, TechSmith and many others. However, all existing screen capture software applications have one thing in common: the input is limited to the video RAM of the computer the software is currently running on. In other words the software only takes a screen capture of its own monitor.

The big problem in developing websites is that small coding mistakes can make big differences in layout and how the site behaves from browser to browser. Sites that look just fine in Explorer are unusable in Netscape, or on a Macintosh (to say nothing of Linux browsers and other less common ones like Opera). This problem is particularly bad if sites use JavaScript, DHTML, pop-up windows, style-sheets, and all the other functions that make websites fun and easy to use.

Developers and customer service reps are often confronted with a bug or user problem on a configuration they do not have readily available on their own system (for example, a language pack, or certain drivers, or different OS build numbers). They need temporary access to a system that allows them to test the problem. Currently there exist a number of Remote Access software (RAS) applications and services including Symantec's Remotely Possible, Microsoft's Remote Desktop, Netopia's Timbuktu, Apple's Remote Control, GoToMyPC.com, UNIX X-Windows, as well as many open-source applications based on the Remote Frame Buffer (RFB) protocol (RealVNC, TrueVNC, UltraVNC). All of these applications are designed to allow a user to take control of a remote computer by intercepting video screen updates and sending them over the network to a remote client. That remote client then sends keyboard strokes and mouse movements over the network which are delivered to the remote machine and passed to the operating system as if the user had interacted directly with the hardware.

Many systems exist to manage and track computer rental time. Internet Café's, Kinko's and libraries all use systems that provide similar billing features.

Also, there are hundreds of spam filters on the market today including many spam filters that are built right into the ISP's email servers. Each tool is constantly being improved, changed and updated. Many spam filters update themselves frequently based on in-bound statistics, third-party services, and other rapidly changing indicators.

Consequently it is virtually impossible to ensure that a given email passes through all the spam filters without an automated solution.

There is still room for improvement in the art.

SUMMARY OF INVENTION

The current invention allows a user to evaluate web pages, emails, or software across different operating systems without requiring the user to have the operating system being tested. The patent has a novel method and system to (1) generate screen captures in parallel, (2) create counter-anti-spam reporting and (3) a method to remotely interact any arbitrary operating system (DVA).

The system's innovation is (1) the capture software that enables a user to submit a single request and have that request distributed to parallel machines for fulfillment; (2) the proxy server that enables the system to determine precisely when the webpage or email has been delivered; (3) the proxy server that automatically loads a user-selected operating system, opens a remote connection, (4) and bills user based on usage; (4) an email server that rather than discarding spam, reports back to the sender the results of any anti-spam software and recommends remedies to circumvent the anti-spam filter.

It is a great way to quickly test many functions across all the browsers and operating and E-mail systems.

DEFINITIONS

Browser: a software program that runs on a client host and is used to request Web pages and other data from server hosts. This data can be downloaded to the client's disk or displayed on the screen by the browser.

Client host: a computer that requests Web pages from server hosts, and generally communicates through a browser program.

Content provider: a person responsible for providing the information that makes up a collection of Web pages.

Embedded client software programs: software programs that comprise part of a Web site and that get downloaded into, and executed by, the browser.

Host: a computer that is connected to a network such as the Internet. Every host has a hostname (e.g., mypc.mycompany.com) and a numeric IP address (e.g., 123.104.35.12).

HTML (HyperText Markup Language): the language used to author Web Pages. In its raw form, HTML looks like normal text, interspersed with formatting commands. A browser's primary function is to read and render HTML.

HTTP (HyperText Transfer Protocol): protocol used between a browser and a Web server to exchange Web pages and other data over the Internet.

HyperText: text annotated with links to other Web pages (e.g., HTML).

IP (Internet Protocol): the communication protocol governing the Internet.

Remote Access software (RAS): software designed to allow a user to take control of a remote computer by intercepting video screen updates and sending them over the network to a remote client that remote client then sends keyboard strokes and mouse movements over the network which are delivered to the remote machine and passed to the operating system as if the user had interacted directly with the hardware.

Server host: a computer on the Internet that hands out Web pages through a Web server program.

URL (Uniform Resource Locator): the address of a Web component or other data. The URL identifies the protocol used to communicate with the server host, the IP address of the server host, and the location of the requested data on the server host. For example, "http://www.lucent.com/work.html" specifies an HTTP connection with the server host www.lucent.com, from which is requested the Web page (HTML file) work.html.

UWU server: in connection with the present invention, a special Web server in charge of distributing statistics describing Web traffic.

Visit: a series of requests to a fixed Web server by a single person (through a browser), occurring contiguously in time.

Web master: the (typically technically trained) person in charge of keeping a host server and Web server program running.

Web page: multimedia information on a Web site. A Web page is typically an HTML document comprising other Web components, such as images.

Web server: a software program running on a server host, for handing out Web pages.

Web site: a collection of Web pages residing on one or multiple server hosts and accessible through the same hostname (such as, for example, www.lucent.com).

BRIEF DESCRIPTION OF DRAWINGS

Without restricting the full scope of this invention, the preferred form of this invention is illustrated in the following drawings.

DETAILED DESCRIPTION

The following description is demonstrative in nature and is not intended to limit the scope of the invention or its application of uses.

There are a number of significant design features and improvements incorporated within the invention.

Figure 1:
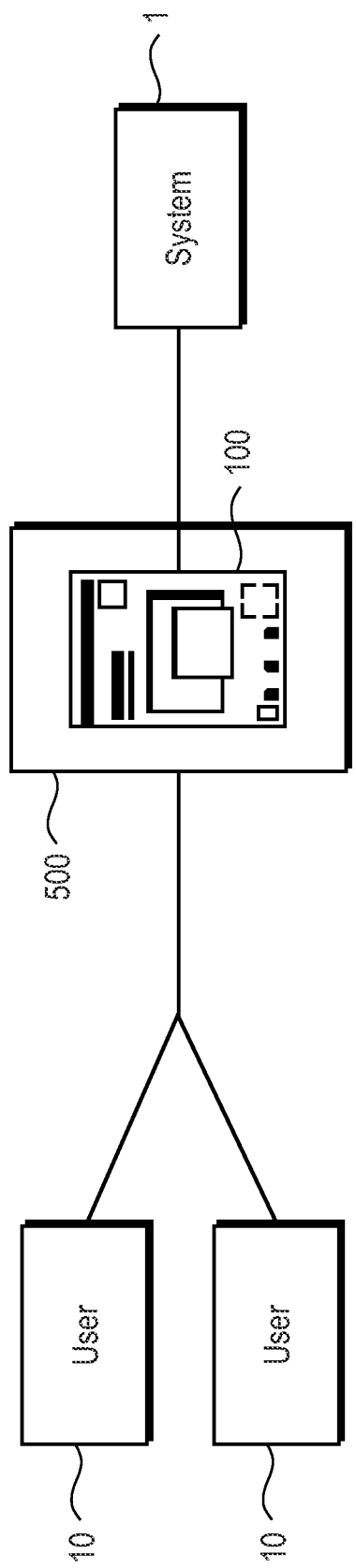
FIG. 1 displays a diagram of a computer network.

FIG. 1 illustrates a functional diagram of a computer network for World Wide Web 500 access to the System 1 from a plurality of Users 10 who accesses the system Web Site 100 or the Users 10 can connect directly to the System 1. The system 1 can be web based, network based or on a Users 10 computer. Accessing the System Web Site 100 can be accomplished directly through a communication means such as a direct connection, an intranet, a local Internet Service Provider, often referred to as ISPs, or through an on-line service provider like CompuServe, Prodigy, American Online, etc. or Wireless devices using services like AT&T or Verizon.

The system 1 is set to run a on a computing device. A computing device on which the present invention can run would be comprised of a CPU, Hard Disk Drive, Keyboard, Monitor, CPU Main Memory and a portion of main memory where the system resides and executes. A printer can also be included. Any general purpose computer with an appropriate amount of storage space is suitable for this purpose. Computer Devices like this are well known in the art and are not pertinent to the invention.

Figure 2:
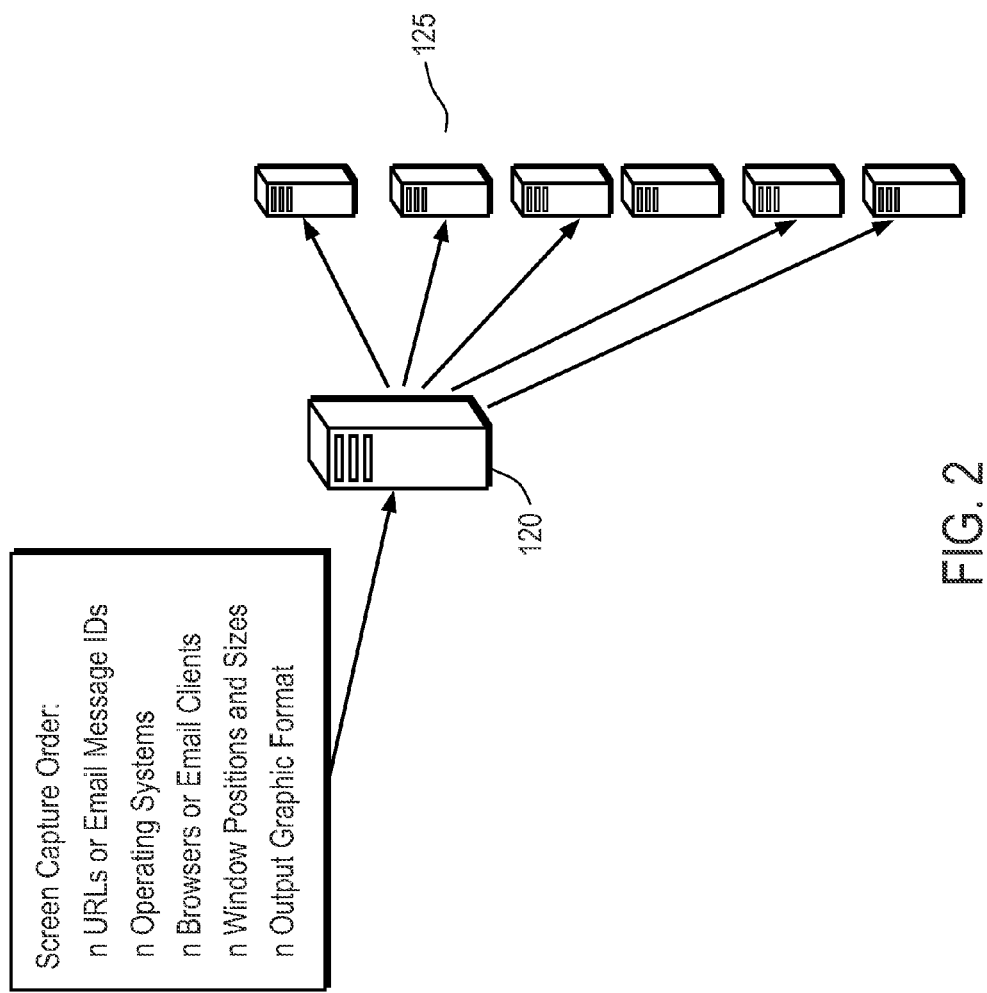
FIG. 2 displays the capture function of the system.

The current invention is a system 1 that is a novel method and system to (1) generate screen captures in parallel, (2) create counter-anti-spam reporting and (3) a method to remotely interact any arbitrary operating system. As shown in FIG. 2, a single request is made to a central server 120 containing a capture order 150 such as a Screen Capture Order with n URLs or Email Message IDs, n Operating Systems, n Browsers or Email Clients, n Window Positions and Sizes and n Output Graphic Format. The order 150 is parsed and sent to individual computers 125 based on their ability to service the individual parts of an order. (E.g. The Macintosh computers get the Macintosh requests, the Linux computers get Linux requests.) The captures are generated in parallel The resulting captures are delivered to the user 10.

This allows the user to take screen captures using the input of video RAM of any arbitrary computer. Moreover, a shown in FIG. 2, it allows the user to take multiple simultaneous screen captures across an arbitrary number of computers in parallel. This is a unique and innovative idea.

Creating a bitmap file of video ram is trivial. There are many methods to accomplish this task. Java's Robot classes, LEAD Tools API libraries, Microsoft MFC libraries, Apple's AppleScript have all offered this basic function for many years. The process of creating a screen capture is well documented and available in any computer science college textbook.

Programmatically launching a browser or email client with a pre-determined page is also trivial and virtually all browser's and email clients offer a command line interface or API to do so. Closing a browser or email client is equally pedestrian.

However, the process of choosing an arbitrary browser or email client, launching said browser or email client, reliably positioning and resizing the window, taking a screen capture, writing it to disk, saving that file to disk, and closing that browser without creating any side-effects or leaving any open windows or Terminate and Stay Resident Programs (TSR's) is non-trivial and innovative.

Moreover, no software or process currently exists to provide a mechanism to submit a list of URL's into a pipeline and those URL's loaded into a browser and captured.

The BCService function of the system 1 is the software that allows a single computer to accomplish this set of complex tasks with a single XML request.

Proxy Servers exist for many tasks. Caching web content, port redirection, encryption and tunneling servers are a few examples. Manufacturers include Cisco, Akamai, even Symantec, and many firewalls can be considered proxy servers.

Many proxy servers log and monitor network traffic or other network activity. One area that is close to proxy function (BCSproxy) of the system 1 is a network performance monitor that measures TTFB (Time to First Byte) and TTLB (Time to Last Byte). However these metrics are aggregate and are not used for triggering events.

However none exist for the purpose of (1) determining the exact moment a pre-defined webpage is completely delivered and (2) providing external notification services based on that event such as is done in the system 1.

This innovative idea allows BCService function to determine exactly when to take the screen capture thus minimizing idle time and preventing a screen capture from occurring before all the images and objects have fully loaded.

The BCService function is the main java program. It fetches orders from the database, loads and kills the browsers on each machine 125, takes the screen captures, saves them to a memory means such as a disk, updates the system's database. In the system, each machine 125 continually Polls server 120 for Orders via the BCService function.

The BCService function finds an open order (order=one or more url-browser combinations), marks the order as pending, copies the order locally for processing.

For each url-browser combination using an HTML template write a new script_runner.html file to disk, call the specific browser from the command line, passing script_runner.html as the parameter, the script_runner opens in the browser and using javascript loads the requested URL, when the URL is completely loaded, BCProxy function instructs BCService function to take a screen capture using java.Robot class, the bitmap is written to a memory means such as a disk, the BCService function gets a return value and updates the database accordingly, the BCService function calls a browser specific kill script, that kills the browser process and any ancillary processes (e.g. Adobe Acrobat, Flash, etc), the order completes, the system's database is updated, and the process repeats.

The Script_runner.html is as below: "<html><SCRIPT LANGUAGE="JavaScript">window.resizeTo({{WIDTH}}, {{HEIGHT}});window.moveTo({{X}}, {{Y}});window.location.href="{{URL}}";</SCRIPT></html>." The BCProxy function is a proxy server on each capturing machine 125 that determines when a pages is fully loaded by monitoring the network traffic to and from the browser. BCProxy function tells the BCService function when to take the screen capture to ensure it doesn't take the capture before the page is fully loaded and doesn't wait any longer than necessary. The BCProxy function is the key to the scalable performance of the system 1.

The DVA Function

Many systems exist to manage and track computer rental time. Internet Café's, Kinko's and libraries all use systems that provide similar billing features.

The DVA function of the system 1 is a combination of (1) a generic computer rental application; (2) off-the-shelf RFB-based remote control software; and (3) a server farm of a plurality of n computers.

Figure 3:
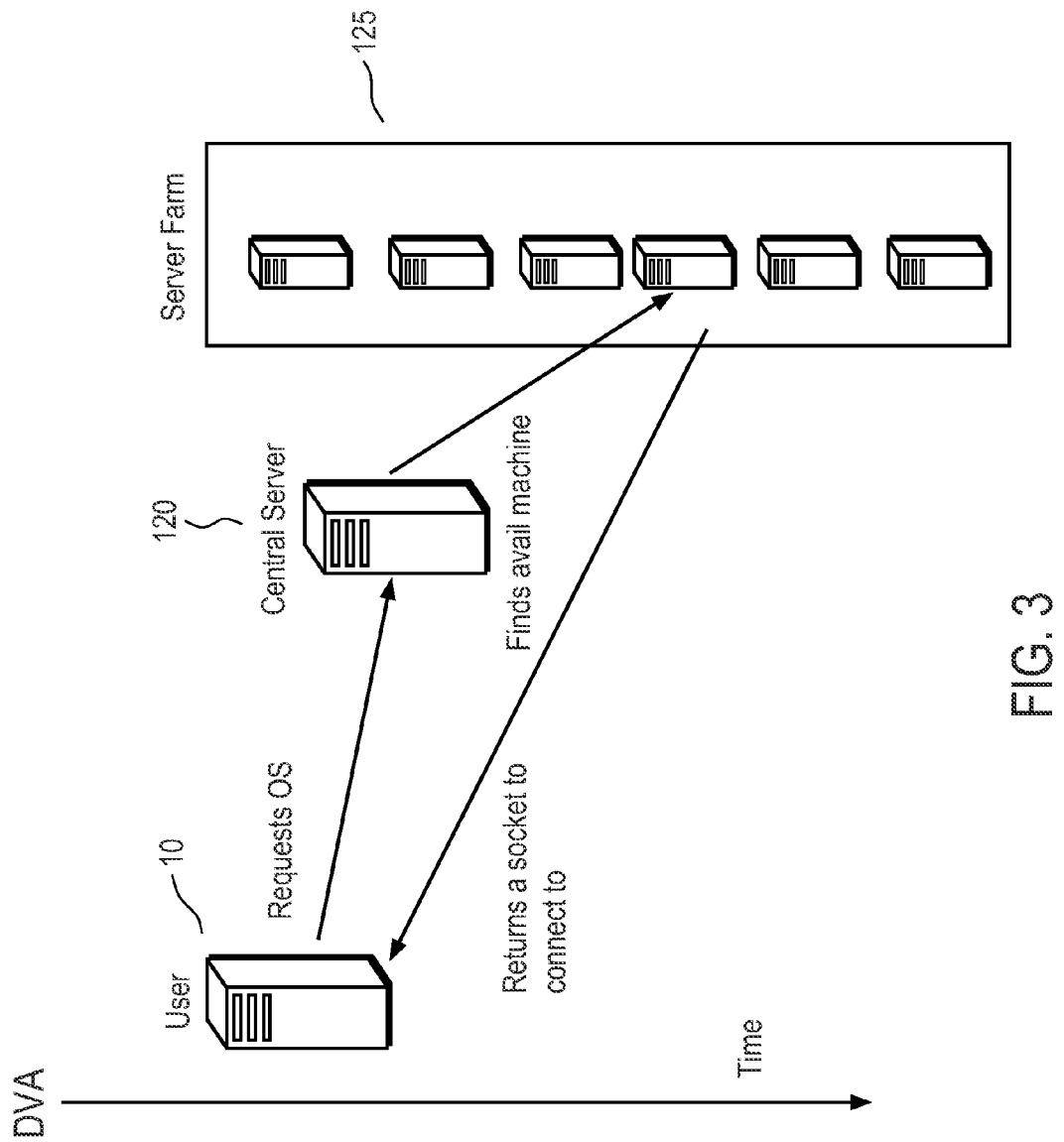
FIG. 3 displays the BCA function.

The DVA function, as shown in FIG. 3, is a service that allows a user to select an operating system from a list of available OS'es. That user 10 is then allocated a machine from the server farm and given a socket to establish an RFB connection for remote control. When the user 10 establishes the RFB connection, billing is initiated, and the user 10 is given complete control over the remote computer. When the session ends, a bill is generated and the user is charged for their time.

The DVA function process is as follows: the User 10 requests a specific Operating System, the Central server 120 finds available machine 125 in server farm, the system 1 loads the requested operating system in machine and notifies the user 10 what socket to connect to, the User 10 connects, Billing is initiated, the User 10 interacts with remote machine, the User 10 logs out, Billing is stopped, the User is invoiced and charged and the Machine 125 is released back into the pool.

While there is an abundance of prior art in the three areas described above, there is no prior art that combines all three into a single service.

The Anti-Spam Counter Function

Anti-Spam software has existed since the early days of the Internet. McAfee, Symantec, Microsoft, and many others all provide anti-spam software. Anti-spam software is software that attempts to determine the whether a given email is considered spam.

SpamCam is counter-anti-spam software. It is software that provides a sender detailed reports on which anti-spam software applications are flagging his/her message as spam, why it was flagged, and what the user can do about it, and where possible makes changes to the message or delivery mechanisms to cause the message not to be flagged so that the user may circumvent the anti-spam software in future messages.

Currently, there is no known example of counter-anti-spam software.

Figure 4:
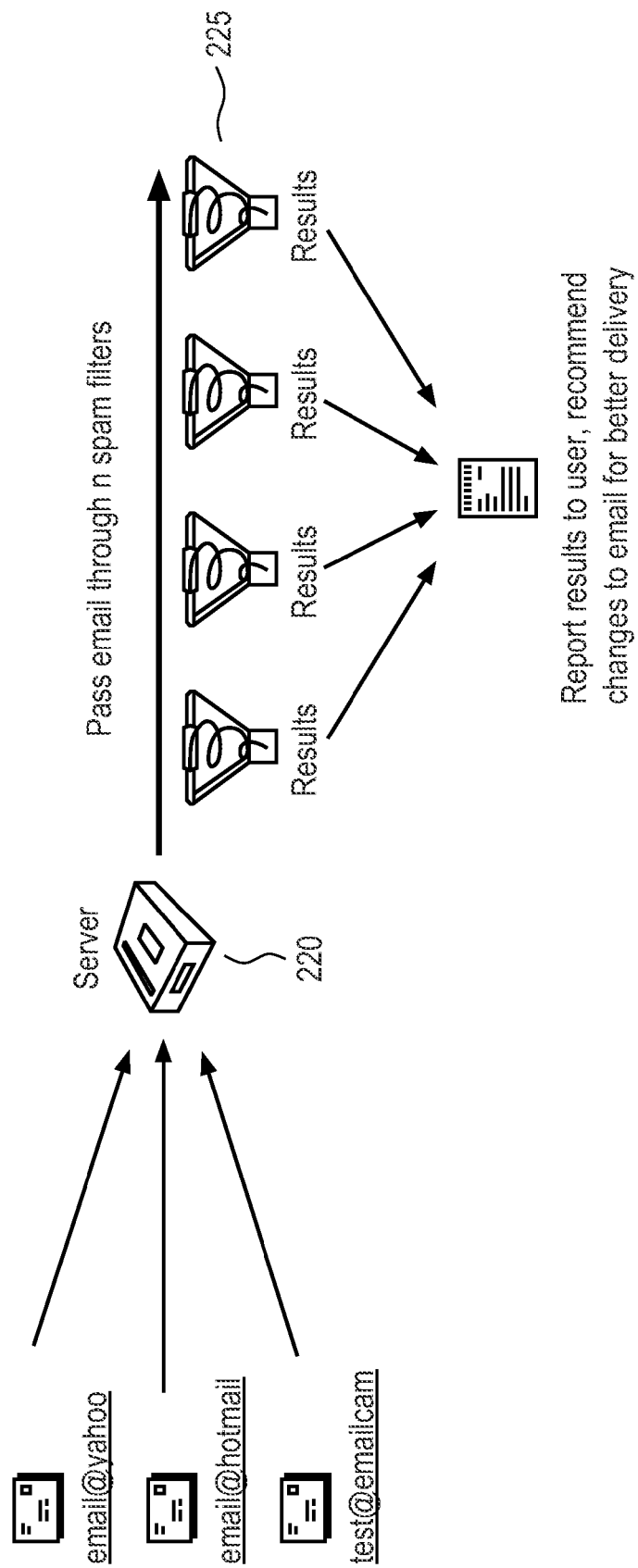
FIG. 4 displays the E-mail servers.
Figure 5:
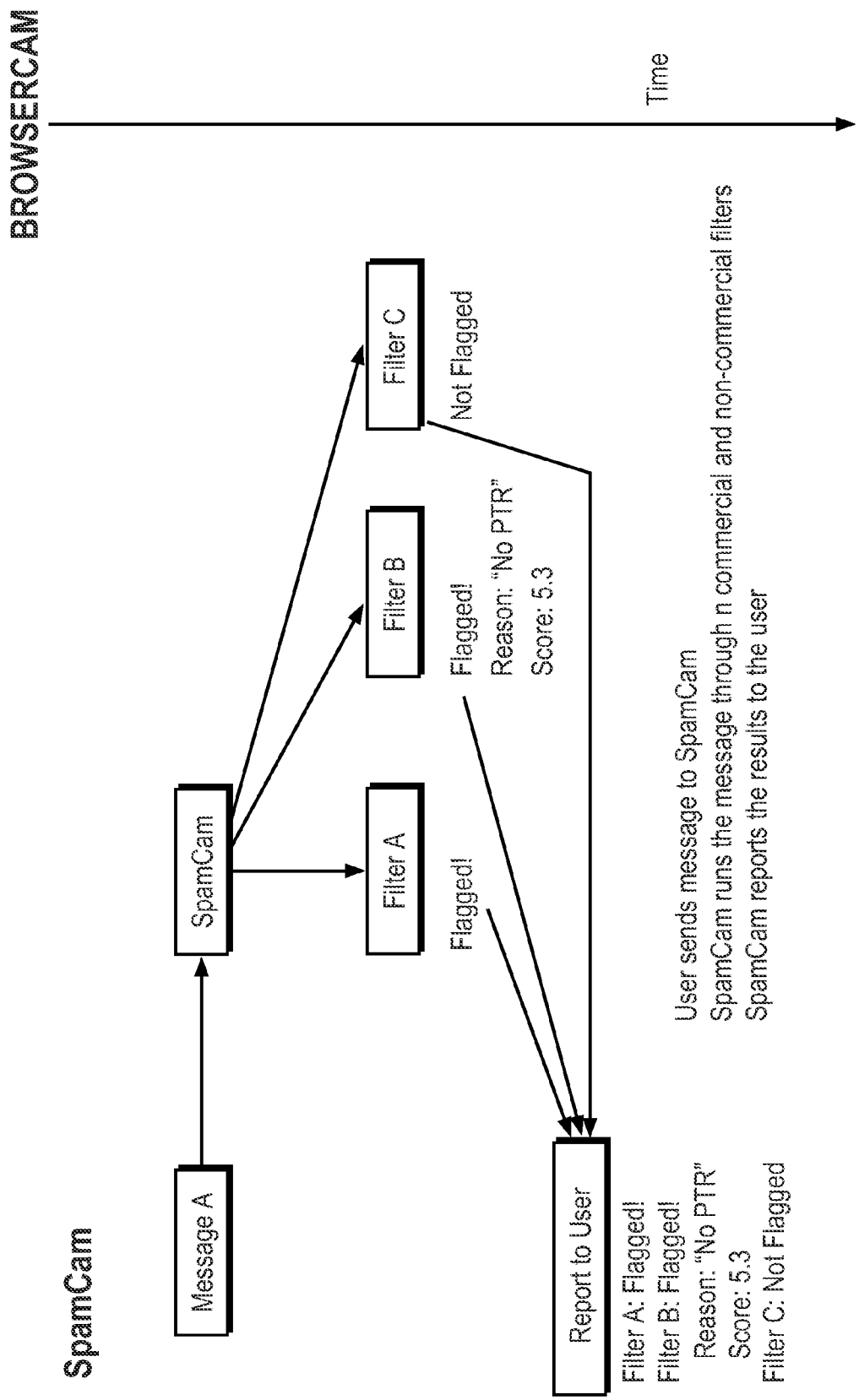
FIG. 5 displays a E-mail being flagged by the Spam filter.

As shown in FIG. 4, the counter-anti-spam process of the system is composed of an email server 220, a series of email accounts 225 at the large ISP's (including Yahoo, Hotmail, AOL, Earthlink, etc.), and n number of spam filters (for example Spam Assassin, Spam Guard, Spam Inspector, Spam Dog, etc.) and n number of virus filters. Users 10 are given a list of emails to send test emails to, including emails at the ISP's (e.g. test@emailcam.com, emailcam@yahoo.com, emailcam@hotmail.com). When a user 10 sends an email to one of the testing accounts, the system's server picks up the email and runs it through the various spam filters, and records the results. In the preferred embodiment, a test report is then returned to the user as shown in FIG. 5.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A physical computer readable medium having computer readable code thereon, the medium comprising:
   instructions for generating a capture request operable to perform screen captures in parallel further including:
      instructions for identifying a set of servers each having an independent operating system and responsive to a central server for launching a browser responsive to a Uniform Resource Locator (URL) request;
      instructions for receiving, from a user, a request indicative of a URL and the operating system to employ;
      instructions for fulfilling, by the browser, the URL request by loading a set of elements in a web page denoted by the URL, each launched browser defining a URL Browser combination;
   instructions for remotely interacting with a plurality of operating systems responsive to the capture request for fulfilling the capture request on a completed web page, wherein fulfilling the capture request includes instructions for denoting a specific network identifier corresponding to the server having the requested one of the plurality of operating systems, and wherein performing the screen capture further includes:

instructions for scanning a queue of received web page requests;
instructions for identifying web page requests marked as complete further comprising:
  instructions for matching the web page with the queue of web page requests to determine if the web page is marked as complete, wherein determining when the web page is complete further comprises instructions for identifying the set of elements in the web page;
  instructions for defining a web page tree corresponding to the set of elements;
  instructions for receiving an element in the set of elements;
  instructions for marking a corresponding node in the web page tree that the element has been received; and
  instructions for determining if all elements defined in the web page tree have been received;
instructions for, upon determining web page completion, taking the screen capture; and
instructions for terminating the browser session by generating a browser kill instruction from the central server, the kill instruction generated in response to an indication of web page completion from the server that launched the browser.

2. The computer readable medium of claim 1 further comprising instructions for receiving a request from a user;
  instructions for generating a capture order from the request;
  instructions for parsing the capture order; instructions for sending the capture order to individual processing units, the capture orders generated in parallel; and
  instructions for delivering results to the user.

3. The computer readable medium of claim 2 further comprising instructions for choosing the individual processing units based on an ability of the individual processing units to perform, the ability based on corresponding operating systems.

4. The computer readable medium of claim 1 wherein the computer readable code thereon is Internet based.

5. The computer readable medium of claim 1 wherein the computer readable code thereon is network based.

6. The computer readable medium of claim 1 wherein the computer readable code thereon is written in Java.

7. The computer readable medium of claim 1 further comprising instructions for selecting a processing means from a server farm, establishing a RFB connection for remote control.

8. The computer readable medium of claim 7 further comprising instructions for initiating billing for the RFB connection.

9. The computer readable medium of claim 8 further comprising instructions for releasing the processing means to the server farm when it is done processing.

10. A physical computer readable medium having computer readable code thereon, the medium comprising:
  instructions for generating a capture request operable to perform screen captures in parallel, further including:
    instructions for identifying a set of servers each having an independent operating system and responsive to a central server for launching a browser responsive to a Uniform Resource Locator (URL) request;
    instructions for receiving, from a user, a request indicative of a URL and the operating system to employ;
    instructions for fulfilling, by the browser, the URL request by loading a set of elements in a web page denoted by the URL, each launched browser defining a URL Browser combination;
  the instructions for generating the screen captures further including:
    instructions for scanning a queue of received web page requests;
    instructions for identifying a machine for fulfilling the capture request by denoting a specific network identifier corresponding to the server having the requested operating system;
    instructions for identifying web page requests marked as complete;
    instructions for matching the web page with the queue of web page requests to determine if the web page is marked as complete, wherein the instructions for determining when the web page is complete further comprises:
      instructions for identifying a set of elements in the web page;
      instructions for defining a web page tree corresponding to the set of elements;
      instructions for receiving an element in the set of elements;
      instructions for marking a corresponding node in the web page tree that the element has been received; and
      instructions for determining if all elements defined in the web page tree have been received;
    instructions for; upon determining web page completion, taking the screen capture; and
    instructions for terminating the browser session by generating a browser kill instruction from the central server, the kill instruction generated in response to an indication of web page completion from the server that launched the browser.

11. The computer readable medium of claim 10 further comprising instructions for receiving a request from a user;
  instructions for generating a capture order from the request;
  instructions for parsing the order;
  instructions for sending the order to individual processing units;
  instructions for generating the capture orders in parallel; and
  instructions for delivering results to the user.

12. The computer readable medium of claim 11 further comprising instructions for choosing the individual processing units based on an ability of the individual processing units to perform.

13. The computer readable medium of claim 10 wherein the computer readable code thereon is Internet based.

14. The computer readable medium of claim 10 wherein the computer readable code thereon is network based.

15. The computer readable medium of claim 10 wherein the computer readable code thereon is written in Java.

16. A method for simultaneously analyzing a plurality of web page requests receivable by target systems comprising:
  identifying a set of servers each having an independent operating system and responsive to a central server for launching a browser responsive to a Uniform Resource Locator (URL) request;
  receiving a plurality of requests from each of a plurality of users, each of the requests indicative of a URL denoted web page for which analysis is sought and an operating system to which the web page is responsive;
  for each of the plurality of requests:
    identifying a target machine having the corresponding operating system;

launching a browser responsive to the operating system and the request;

reporting a connection medium through which the launched browser is accessible;

fulfilling, by the browser, the URL request by loading a set of elements in a web page denoted by the URL, each launched browser defining a URL Browser combination;

executing, via the reported connection medium, the target web page; and identifying when the target web page is delivered, identifying delivery completion further comprising:
 building a tree of elements defining the web page;
 identifying each element as a terminal object or expandable object, the expandable objects capable of loading other elements;
 marking each element as fetched or unfetched, fetched indicative of complete rendering of an element; and
 recursively traversing the tree to confirm each element is marked as fetched;

generating analysis results by initiating a plurality of parallel screen captures for each of the executing web pages upon determining web page delivery completion; and terminating the browser session by generating a browser kill instruction from the central server, the kill instruction generated in response to an indication of web page completion from the server that launched the browser.

17. The method of claim 16 wherein the connection medium is a socket providing an interprocess communication medium (IPC) for initiating user access to the target web page.

18. The method of claim 17 wherein executing the target web page further comprises writing a script indicative of the launched browser and the target web page and invoking the web page via the script.

19. The method of claim 18 wherein the terminal objects are binary objects for rendering and the expandable objects are HTML objects, the HTML objects expandable into other HTML objects and binary objects.

20. The method of claim 16 wherein identifying when the target web page is delivered comprises:
 determining that the target web page is delivered;
 generating a notification associated with a delivery of the target web page;
 transmitting the notification identifying that the target web page is delivered; and
 utilizing the notification of delivery of the target web page to invoke at least one of the plurality of parallel screen captures for each of the executing web pages, the notification utilized to minimize idle time, and to prevent the plurality of parallel screen captures from occurring prior to the delivery of the target web page associated with each of the respective screen captures.

21. The method of claim 16 further comprising, for each URL-browser combination:
 generating a script file for launching the browser on the server, the script file specific to the operating system on the server; and
 launching the browser and ancillary components remotely on the server from the central server, wherein terminating the browser terminates the ancillary components.

* * * * *